(12) United States Patent
de Jong et al.

(10) Patent No.: US 10,108,231 B2
(45) Date of Patent: Oct. 23, 2018

(54) OVERMOLDED FORCE SENSING GASKET

(71) Applicant: Apple Inc., Cupertino, CA (US)

(72) Inventors: Erik G. de Jong, Cupertino, CA (US);
Ryan C. Perkins, Cupertino, CA (US);
Trevor J. Ness, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 15/264,544

(22) Filed: Sep. 13, 2016

(65) Prior Publication Data

US 2017/0090521 A1    Mar. 30, 2017

Related U.S. Application Data

(60) Provisional application No. 62/234,601, filed on Sep. 29, 2015.

(51) Int. Cl.
| | | |
|---|---|---|
| *G06F 1/16* | (2006.01) | |
| *G01L 1/14* | (2006.01) | |
| *F16J 15/06* | (2006.01) | |

(52) U.S. Cl.
CPC .......... *G06F 1/1656* (2013.01); *F16J 15/064* (2013.01); *G01L 1/142* (2013.01); *G06F 1/163* (2013.01)

(58) Field of Classification Search
CPC ...... F16J 15/064; F16J 15/0818; F16J 15/022; F16J 15/3284; F16J 15/021; F16J 2015/0868; G01L 19/0038; G01L 19/0092; G01L 19/147; G01L 23/10; G01L 11/025; G01L 1/142; G06F 1/1656; G06F 1/1637; G06F 1/163; G06F 1/181; G06F 2203/04105; G06F 3/0414; G06F 2203/04107; G06F 3/0416; G06F 3/044; G06F 3/046

USPC ....................................................... 361/369.26
See application file for complete search history.

(56) References Cited

U.S. PATENT DOCUMENTS

| | | | |
|---|---|---|---|
| 5,270,507 A | * | 12/1993 | Nakamura ............... B41M 1/30 200/511 |
| 6,861,136 B2 | | 3/2005 | Verlinden |
| 7,199,518 B2 | | 4/2007 | Couillard |
| 7,231,733 B2 | | 6/2007 | Regelin |
| 7,242,398 B2 | | 7/2007 | Nathan |
| 7,535,462 B2 | | 5/2009 | Spath et al. |
| 7,663,607 B2 | | 2/2010 | Hotelling et al. |
| 8,094,247 B2 | | 1/2012 | Allemand et al. |
| 8,164,698 B2 | | 4/2012 | Kim et al. |
| 8,169,332 B2 | | 5/2012 | Son |
| 8,294,869 B2 | | 10/2012 | Yamaguchi |
| 8,330,900 B2 | | 12/2012 | Kuo et al. |
| 8,482,713 B2 | | 7/2013 | Qi et al. |
| 8,582,049 B2 | | 11/2013 | Shim et al. |
| 8,583,187 B2 | | 11/2013 | Kim et al. |
| 8,692,948 B2 | | 4/2014 | Park et al. |

(Continued)

*Primary Examiner* — Dimary Lopez Cruz
*Assistant Examiner* — Ingrid Wright
(74) *Attorney, Agent, or Firm* — Brownstein Hyatt Farber Schreck, LLP (57) ABSTRACT

An elastomeric gasket is disclosed for use in a portable electronic device. The gasket encapsulates flexible circuits which are used to measure force exerted on a cover glass of the device. The gasket reduces the number of layers of material and thus reduces the risk that outside contaminants and liquids may penetrate the gasket layers and enter the portable electronic device and thereby damage the components of the device.

20 Claims, 11 Drawing Sheets

(56) References Cited

U.S. PATENT DOCUMENTS

| | | | |
|---|---|---|---|
| 8,885,135 B2 | 11/2014 | Park | |
| 9,223,162 B2 | 12/2015 | DeForest et al. | |
| 2006/0204675 A1 | 9/2006 | Gao | |
| 2008/0218369 A1 | 9/2008 | Krans | |
| 2009/0106974 A1* | 4/2009 | Brandenburg | B29C 45/14377 29/841 |
| 2011/0216020 A1 | 9/2011 | Lee et al. | |
| 2012/0127387 A1 | 5/2012 | Yamato et al. | |
| 2014/0278178 A1* | 9/2014 | Feig | A47G 1/06 702/81 |
| 2016/0077371 A1 | 3/2016 | DeForest et al. | |
| 2016/0139716 A1* | 5/2016 | Filiz | G06F 3/0414 345/174 |

* cited by examiner

OVERMOLDED FORCE SENSING GASKET

CROSS-REFERENCE TO RELATED APPLICATION

This application claims the benefit under 35 U.S.C. § 119(e) of U.S. Provisional Patent Application No. 62/234,601, filed on Sep. 29, 2015, and entitled "Overmolded Force Sensing Gasket," the contents of which are incorporated by reference as if fully disclosed herein.

FIELD

The described embodiments relate generally to portable electronic devices. More particularly, the present embodiments relate to sealing components for portable electronic devices. In still greater particularity, embodiments relate to sealing gaskets between components of a portable electronic device which includes encapsulated force sensing components in the sealing gasket.

BACKGROUND

The use of portable electronic devices has become ubiquitous in modern society. Users have come to depend upon these devices to provide information, entertainment and to communicate with other individuals or entities. Thus, devices such as smartphones, laptop computers, tablets, watches and other devices are carried about by users as they proceed throughout their daily activities. These devices provide audio and visual sensory input for users throughout the day.

Because portable electronic devices are carried by users as they proceed throughout their daily activities, these devices may be subjected to various environments and contaminants. In particular, portable electronic devices that are closely connected to a user such as smartphones and watches may be subjected to these contaminants. For example, a watch that is affixed to the wrist of a user may be subject to substances, which, if allowed to enter the watch, could seriously affect electronic components therein and thus the timekeeping or informational performance of the watch.

A watch or other portable electronic device may also be subjected to harsh environmental conditions by the user. For example, a user may wish to wear a watch while scuba diving or snorkeling. The watch may be immersed in water and subjected to various water pressure depending upon the depth of the user's dive. While deeper dives may produce more pressure, numerous shallower dives subjecting the device to increased pressures over a longer period of time may be more deleterious to the sealing capacity of the device than less frequent deeper dives. In either event, a failure of the seal will likely result in poorer performance and even failure of the device in some cases.

Portable electronic devices may include a display that is covered by a cover glass to protect the surface of the display and the other electronic components within the device. This cover glass may be silicon glass or it may be another optically transparent material such as sapphire or a polymer material to allow the user to observe the display. The cover glass is sealed to the device housing to prevent liquids, chemicals or other contaminants from entering the housing which may deleteriously affect the electronic components of the device and thereby degrade the user's experience and appreciation of the portable electronic device.

SUMMARY

The embodiments result in a cover glass sealing component which is more resistant to the incursion of liquids and other contaminants into a housing of a portable electronic device. In one embodiment, the force sensing gasket is comprised of a layered stack of force sensing flexible circuits which are encapsulated in a compliant gasket material. The material may be compression molded or injection molded around the force sensing flexible circuitry. The gasket may then be used to seal the cover glass to the housing.

By encapsulating the flexible force sensing circuits, the number of sealing interfaces is reduced for the environmental seal between the cover glass and the housing. Molding silicone around the flexible force sensing circuits enables the gasket seal to become more impervious to contaminants including chemical and water ingress. The silicone or other compliant gasket material can be selected to be chemically inert and easy to bond to various materials. In some embodiments, nylon or other material may be used to form the gasket. The gasket is not limited by the composition of the flex material. More robustness to water ingress is important to enable users of the portable electronic device to shower, swim, or even dive with their device.

The gasket seal may be molded in varying configuration embodiments. In one embodiment the gasket may include portions extending above or below the sealing surfaces with the housing or cover glass. In another embodiment, the portions extending beyond the gasket seal may be angular while in another embodiment the portions extending beyond the interface seal are perpendicular to the face of the cover glass or the housing interface.

In yet other embodiments, the gasket may include a channel for receiving liquid glue or other materials. The channel may include irregular surfaces for facilitating the adhesion of the glue. In still other embodiments, the gasket may include aligning features which are complimentary to associated features in the housing for ensuring correct alignment of the gasket between the housing and the cover glass.

A method for making a portable electronic device is also disclosed which includes encapsulating force sensing circuitry in an elastomeric material and using the elastomeric material as a seal between a cover glass and the housing containing electronic components. The method may include molding an elastomeric material including a glue channel for containing liquid adhesive to secure the gasket, housing and cover glass. In another embodiment the method may include molding an aligning feature on the gasket and aligning the gasket feature with a complimentary feature in the housing. In another embodiment more than one type of elastomeric or other material may be used to form the gasket in multiple molding steps.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Many types of portable electronic devices are carried by users. Users have come to be dependent upon these devices for various kinds of information and entertainment. As such the devices are subjected to many hostile environmental conditions including various types of corrosive or deleterious contaminants. Weather can be a factor in affecting performance of the device if dirt or water or other contaminants are allowed to penetrate into the inner workings of the device. In some cases, users may wish to intentionally subject these devices to harsh conditions. For example, a user may wish to wear a watch on an underwater dive which subjects the device to increased pressure and possible water incursion.

Portable electronic devices that are closely connected to a user such as smartphones and watches may be subjected to contaminants in daily use. For example, a watch that is affixed to the wrist of a user may be subject to water, perfume, soft drinks, foodstuffs including mustard or other condiments, sunscreen, sweat, and other substances, which, if allowed to enter the portable electronic device, could deleteriously affect electronic components contained therein and thus adversely affect the performance of the portable electronic device potentially resulting in user dissatisfaction. As a result, manufacturers attempt to seal the exterior surfaces of the device such that these contaminants are prevented from entering into the device. However, the adhesives used to bond different types of material may be attacked by these contaminants which then may degrade the adhesives and ultimately may result in a failure of the seal.

Ensuring a tight seal between the cover glass and the housing in a portable electronic device becomes more problematic when other components such as force sensors must be accounted for. For example, in some portable electronic devices, force sensors may be included in the sealing component between a cover glass and a housing to sense the presence and amount of pressure exerted by a user on the cover glass in response to prompts or as part of a touch-screen selection interface.

Inclusion of force sensors in the sealing component may provide more surface interfaces and thus more opportunity for contaminants to enter the housing through those interfaces. A force sensing gasket may be a layered stack including two or more flexible circuits on each side of a compliant silicone layer with a pressure sensitive adhesive on each side. The completed stack is used to bond the cover glass to the housing for the device. When the cover glass is pressed, the silicone compresses and the flexes move closer to each other. The change in capacitance between the flexes is used to calculate force. The gasket also acts as the environmental seal for the device and sometimes must withstand liquid ingress at elevated pressure, as well as harsh chemical attack from sweat and other foreign substances.

In one embodiment, the force sensing gasket is comprised of a layered stack of force sensing flexible circuits which are encapsulated in a compliant gasket material. The material may be compression molded or injection molded around the force sensing flexible circuitry. Because the number of sealing surfaces is reduced, the embodiments result in a cover glass sealing component that provides less opportunity for incursion of liquids and other contaminants into a housing of a portable electronic device. In some embodiments, more than one type of encapsulating material may be used in multiple molding steps. One type of material could be used between the flexible circuit portions while a second type of material may be used to surround the flexible circuit portions. Mechanical interlocks could be formed in one or both materials to aid in bonding the first and second materials to each other.

By reducing the number of sealing interfaces in the environmental sealing gasket between the cover glass and the housing, the incursion of contaminants is reduced and the electronic components of the device are better protected. Molding silicone around the flexible force sensing circuits enables the gasket seal to become more impervious to contaminants including chemical and water ingress. The silicone or other compliant gasket material can be selected to be chemically inert and easy to bond to various materials. The gasket is not limited by the composition of the flexible circuit material. More robustness to water ingress is important to enable users of the portable electronic device to shower, swim, or even dive with their portable electronic device.

The gasket seal may be molded with varying interface orientations. In one embodiment the gasket may include portions extending above or below the sealing surfaces between the housing or cover glass. In another embodiment, the portions extending beyond the gasket seal may be angular while in another embodiment the portions extending beyond the interface seal are perpendicular to the face of the cover glass or the housing interface.

In yet other embodiments, the gasket may include a channel for receiving liquid glue or other materials. The channel may include irregular surfaces for facilitating the adhesion of the glue. In still other embodiments, the gasket may include aligning features which are complimentary to mating features in the housing for ensuring correct alignment of the gasket between the housing and the cover glass.

These and other embodiments are discussed below with reference to FIGS. 1-10. However, those skilled in the art will readily appreciate that the detailed description given herein with respect to these Figures is for explanatory purposes only and should not be construed as limiting.

Figure 1:
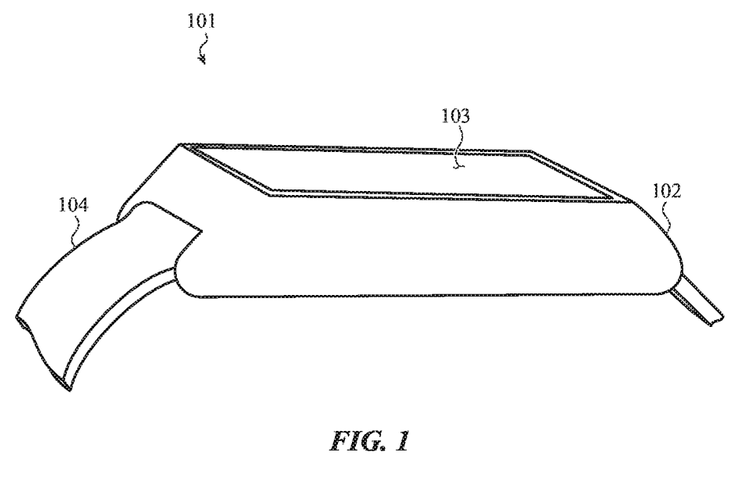
FIG. 1 shows an isometric view of a portable electronic device.

FIG. 1 shows a portable electronic device 101, which may be a watch. Portable electronic device 101 includes a housing 102 and a cover glass 103 which may be a transparent material such as sapphire, silicon glass, various plastics, and polymers. A display is contained within housing 102 and may be visible to a user through cover glass 103. Watch 101 may be removably attached the wrist or other body part of a user or it may be affixed to another object by a band 104. While a watch is shown as the portable electronic device 101, it should be expressly understood that portable electronic device 101 could be a smartphone, laptop computer, tablet or other device.

Figure 2:
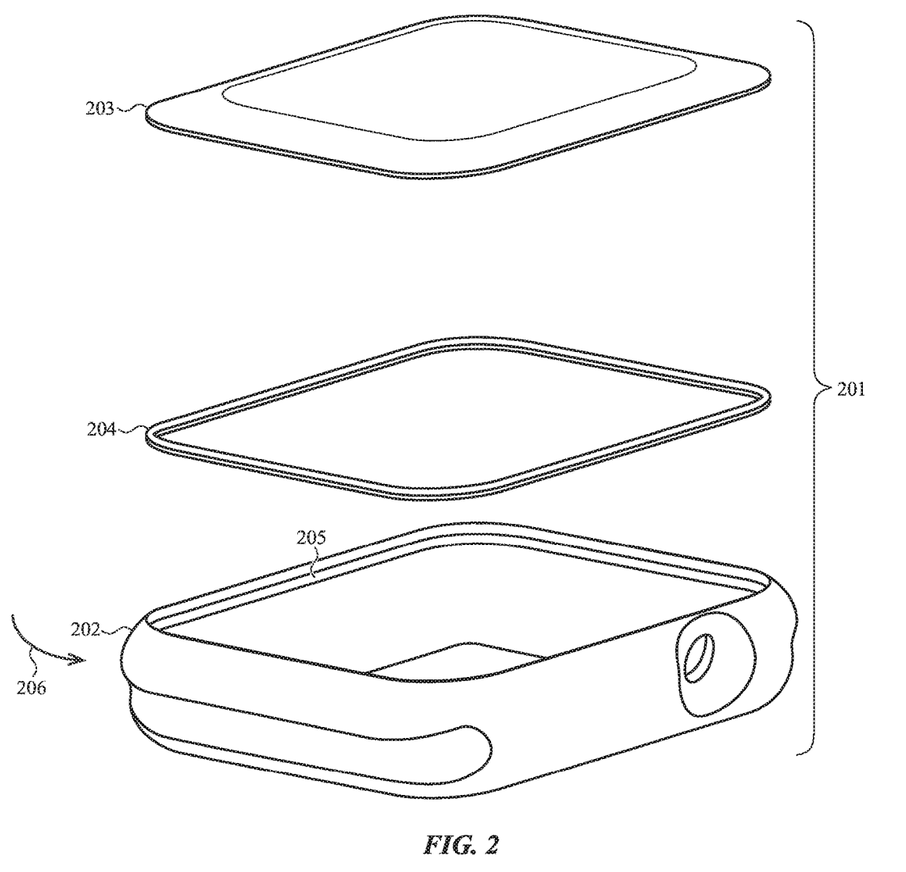
FIG. 2 shows an exploded view of a cover glass assembly with a gasket.

FIG. 2 shows a portable electronic device 201 in an exploded view. A housing 202 may contain electronic components (not shown) such as a display, processor and various circuitry. A cover glass 203 which may be a transparent material is sealed to housing 202 with a sealing gasket 204 which may fit into step portion 205 around the perimeter of housing 202. Sealing gasket 204 provides an elastomeric seal such that water and other environmental contaminants are not permitted to enter into housing 202 from an outside environment through exterior direction 206 which could adversely affect the performance of the electronic components contained therein.

Figure 3:
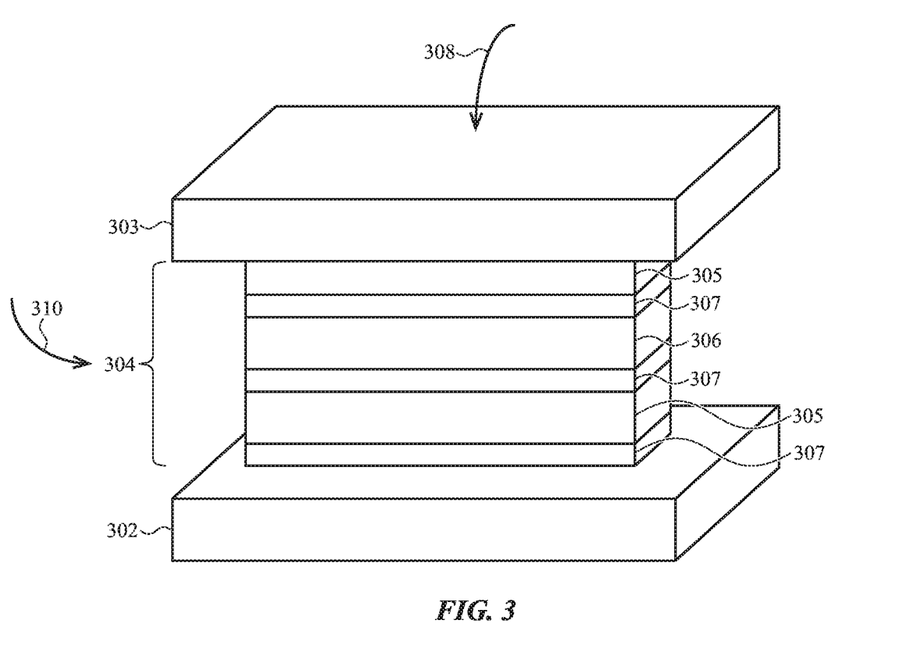
FIG. 3 shows a side view of a layered sealing gasket between a housing and a cover glass.

FIG. 3 shows a side view of a housing portion 302 with a cover glass 303 positioned above and a gasket 304 therebetween. Gasket 304 includes multiple layers which also include flexible circuits 305. An elastomeric layer 306 which may be silicone in one embodiment, is positioned between flexible circuits 305. A plurality of pressure sensitive adhesive layers 307 bond each of layers 302, 305, 306 and 303 to the adjacent layer as shown. The pressure sensitive adhesive layer 307 between flexible circuit 305 and cover glass 303 is not shown in FIG. 3. When cover glass 303 is pressed by a user to exert force as represented by arrow 308, the distance between flexible circuits 305 changes due to the compression of elastomeric layer 306. As the flexible circuits 305 move closer to one another the change in capacitance between those layers 305 is used to calculate the magnitude of force exerted by the user 308.

Referring again to FIG. 3, gasket 304 also acts as an environmental seal for the portable electronic device 201 and must withstand liquid ingress at elevated pressure as well as harsh chemical attacks from foreign substances including sweat, perfume and other liquid or particulate substances. The substances may enter the device around cover glass 303 from outside the device as shown by arrow 310. These substances may attack the various exposed pressure sensitive adhesive layers 307 which are prone to degradation by these substances thereby possibly producing seal failures. If the pressure sensitive layers 307 are degraded by these substances over time resulting in seal failures, then the liquid or other substances may pass between cover glass 303 and housing 302 and enter the interior of housing 302 and come in contact with the electronic components contained therein thus possibly adversely affecting their performance.

Figure 4:
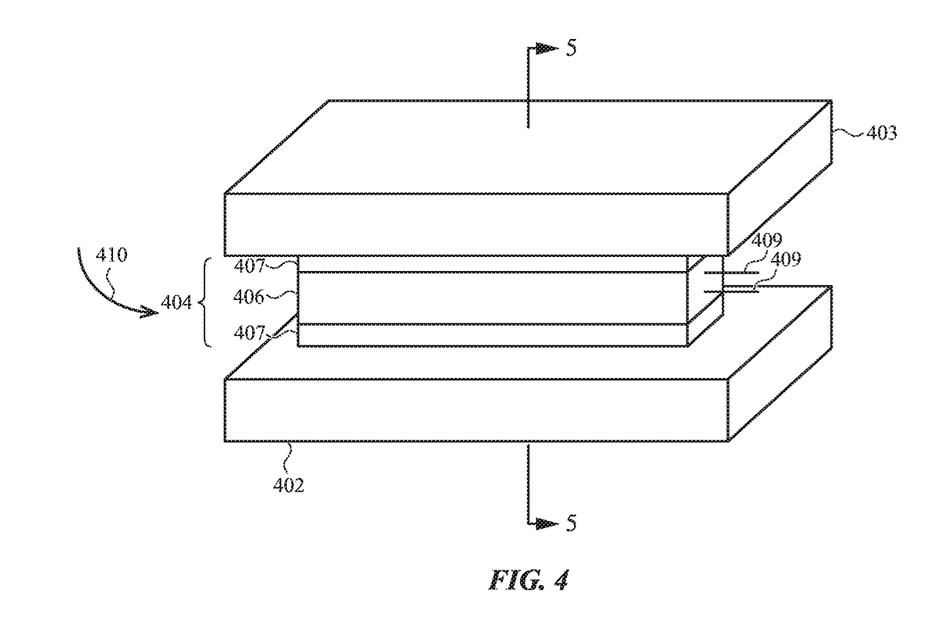
FIG. 4 shows a side view of one embodiment of a sealing gasket with encapsulated force sensing circuitry.

FIG. 4 shows a side view of an embodiment in which the number of interface surfaces has been reduced. In this embodiment, a cover glass 403 and housing 402 have gasket 404 sandwiched therebetween. Gasket 404 includes an elastomeric layer 406 which is attached to cover glass 403 and housing 402 by pressure sensitive adhesive layers 407. In this embodiment, there are only two pressure sensitive adhesive layers 407 as opposed to four adhesive layers 307 seen in FIG. 3. There are thus less adhesive interfaces for harsh chemicals or other environmental contaminants to attack. In this embodiment, the flexible circuits are not visible as they are encapsulated within elastomeric layer 406. The tails or electrical connectors 409 of the encapsulated flexible circuits are visible along one side of gasket 404 which may face the interior of the portable electronic device housing.

Gasket 404, including the flexible circuits, may be compression molded or injection molded in various embodiments. The molding operations could be done in one or two steps. For example, in one embodiment, a first portion of the elastomeric layer 406 could be molded around flexible circuits with the tails or electrical connections outside the mold and used for clamping the flexible circuits. A second molding operation could then be used to mold around the remainder of the flexible circuits leaving just the tails exposed for electrical connection to components of the portable electronic device.

Figure 5:
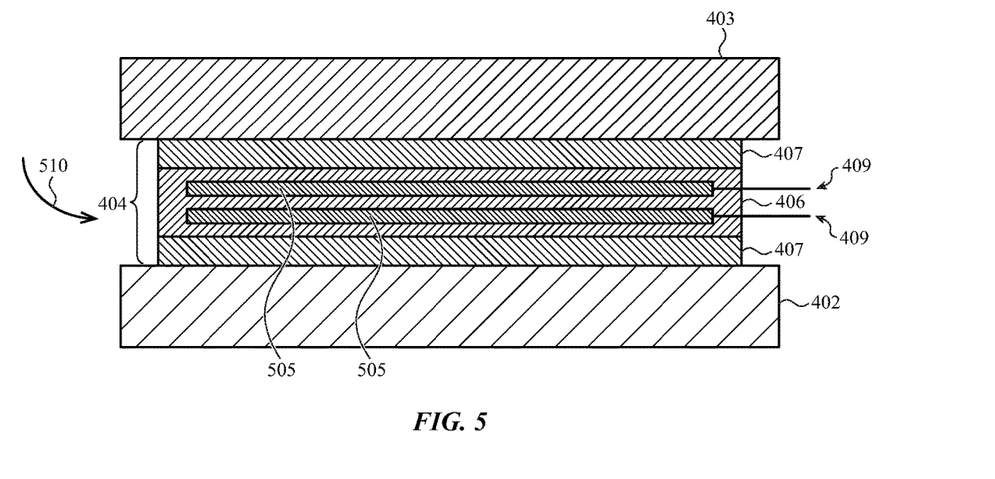
FIG. 5 shows a side sectional view taken through line 5-5 of FIG. 4.

FIG. 5 shows a side sectional view of the embodiment of FIG. 4 through line 5-5 of FIG. 4. Cover glass 403 and housing 402 are affixed by gasket 404 which includes flexible circuits 505 encapsulated in elastomeric layer 406. Electrical connection tails 409 extend from one edge of elastomeric layer 406 to allow electrical connection of flexible circuits 505 to the electronic components in the interior of the portable electronic device housing. The pressure sensitive adhesive layers 407 are reduced to two in this embodiment which reduces the number of surface interfaces that may be attacked by chemicals or other contaminants from outside the device under cover glass 403 as indicated by arrow 510.

Figure 6:
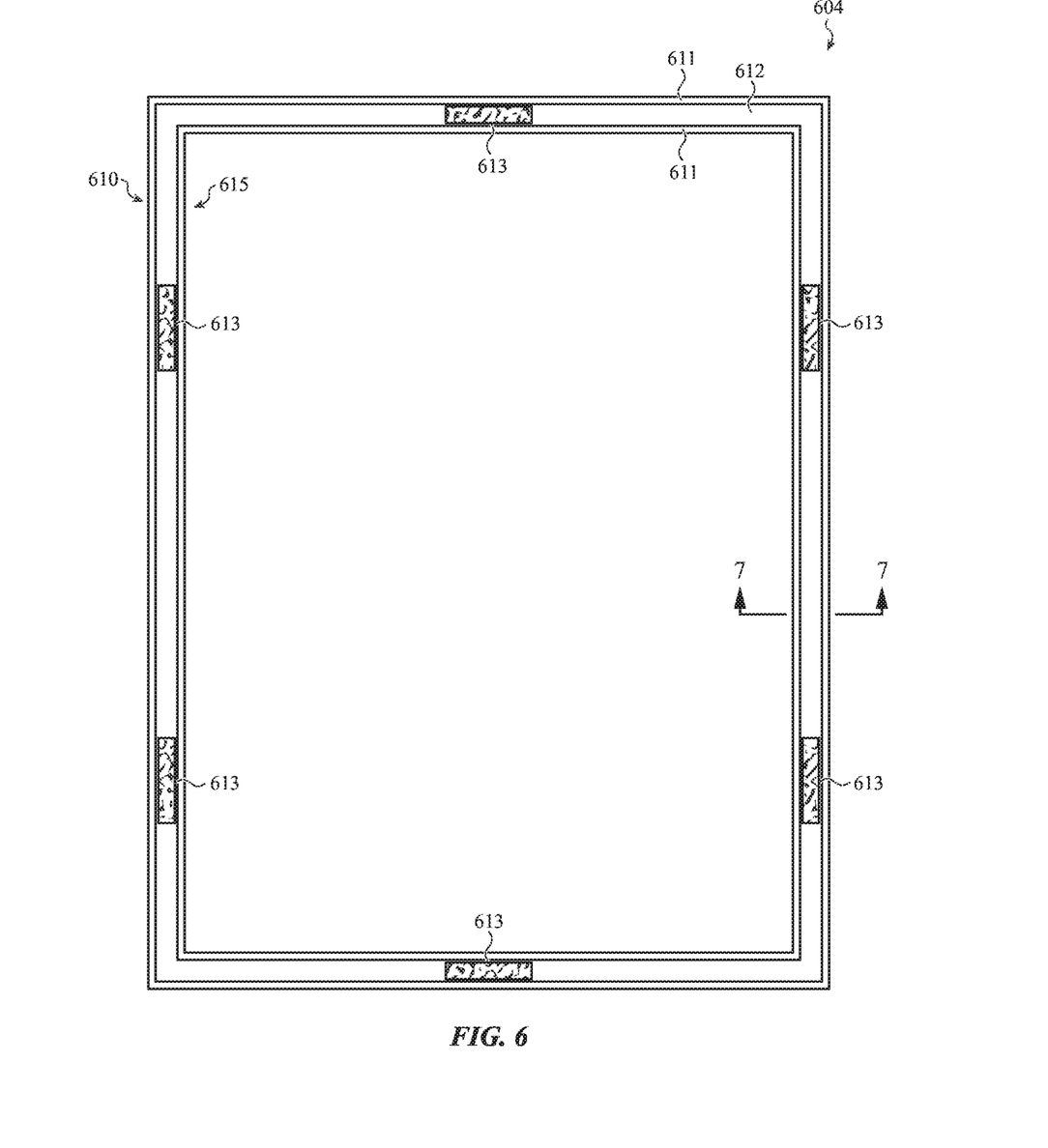
FIG. 6 shows a top view of a sealing gasket.

FIG. 6 shows another embodiment in which an elastomeric gasket 604 is shown in a top view. In this embodiment, edge (or "flap") portions 611 of gasket 604 are molded with a center gluing channel 612 therebetween. A layer of adhesive 613, which may be epoxy, polyurethane or other adhesive, may be placed into gluing channel 612. Adhesive 613 is shown placed in various portions of channel 612 but, in some embodiments, adhesive 613 may be placed around the entire channel 612. As with gasket 204 shown in FIG. 2, gasket 604 is used to seal a cover glass to a housing in a portable electronic device. Gasket 604 includes an exterior side 610 which may be exposed to an external environment and an interior side 615 which faces the interior of the device housing (not shown).

Figure 7:
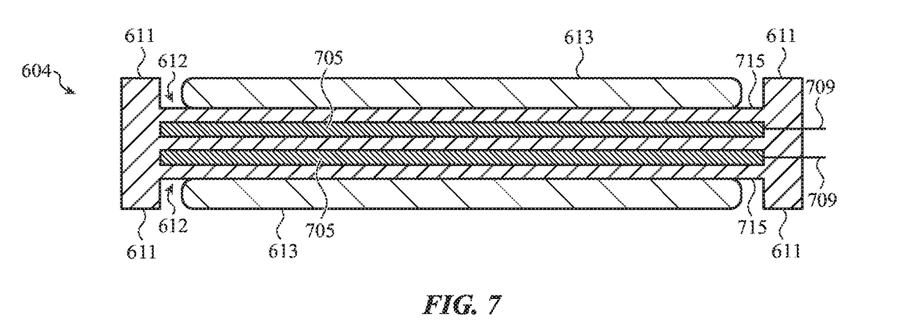
FIG. 7 shows a side sectional view of the sealing gasket taken through line 7-7 of FIG. 6.

FIG. 7 is a side sectional view along the line 7-7 of FIG. 6. A layer of adhesive 613 is placed in the adhesive channels 612. Gasket 604 encapsulates flexible circuits 705 in substantially parallel planes as with prior described embodiments. Electrical connection tails 709 extend from elastomeric gasket material 604. In this embodiment, gasket 604 includes one or more flap portions 611 which extend from the plane of gluing surface 715 in gluing channel 612. In one embodiment, adhesive 613 may be placed in channel 612 so as not to completely fill channel 612 to allow compression of gasket 604 to the cover glass and the housing without forcing adhesive outside of channel 612. Thus, channel 612 functions to minimize the overflow of glue 613 around gasket 604 by containing it within channel 612 when gasket 604 is pressed against the housing or cover glass.

The use of adhesive 613 in place of pressure sensitive adhesive layers in some embodiments permits gasket 604 to be optimized for performance and sealing capabilities. For example, an epoxy glue may be used as adhesive 613 in channel 612 to bond gasket 604 to the housing portion. Epoxy has a high tensile strength and is better at resisting chemical and liquid incursion than a pressure sensitive adhesive. However, the pressure sensitive adhesive has higher shear resistance and will survive a dropping event better than the epoxy adhesive. Thus, in some embodiments, epoxy may be used to bond the gasket to the housing while pressure sensitive adhesive may be used to bond the gasket to the cover glass. The silicone layer may act as a shock absorber to shield the epoxy layer from shear forces.

Figure 8:
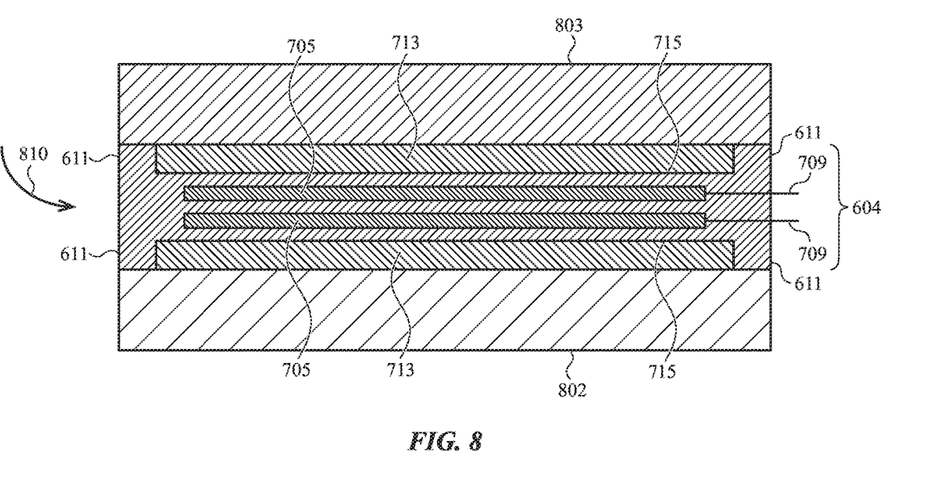
FIG. 8 shows a sectional view of an alternate embodiment of a force sensing sealing gasket taken through line 5-5 of FIG. 4.

FIG. 8 shows the gasket embodiment of FIG. 7 placed between cover glass 803 and housing 802. Gasket 604 encapsulates flexible circuits 705 with electrical connection tails 709 extending from flexible circuits 705 through gasket 604 for connection to the electrical components on the interior of housing 802. Adhesive 713 substantially fills channel 715 but is contained within channel 715 and does not overflow between flap portions 611 and either cover glass 803 or housing 802 which could otherwise compromise the liquid sealing capabilities of gasket 604. Liquid or other contaminant incursion from the exterior of the device (arrow 810) is minimized as there are only the interfaces between gasket 604 and cover glass 803 and between gasket and housing 802 through which such incursion could occur. In addition, the use of liquid adhesive 713 such as epoxy minimizes this possibility because epoxy is more resistant to such chemical and liquid incursion.

Figure 9:
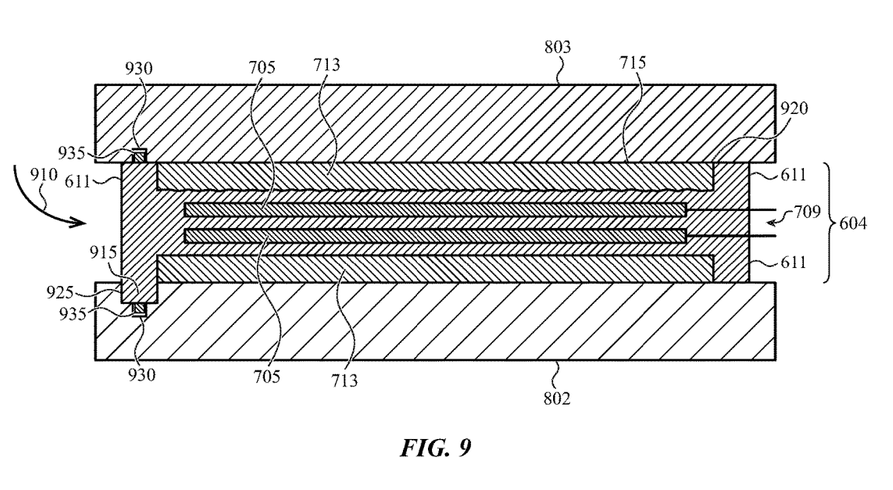
FIG. 9 shows a side sectional view of an alternate embodiment of a force sensing gasket taken through line 5-5 of FIG. 4.

FIG. 9 shows the embodiments of shows the embodiment of FIGS. 7 and 8 including an uneven surface 920 in one or both channels 715 to increase the adhesion of adhesive 713 to gasket 604. As with the embodiment of FIG. 8, flexible circuits 705 lie in substantially parallel planes to allow the change in capacitive between them to measure force exerted by a user on cover glass 803. In this embodiment, flap portions 611 of gasket 604 additionally may include a first, a second, or more extended alignment flaps 915 which may cooperate with one or more grooves 925 in housing 802. While groove 925 and flaps 915 may be used on both sides of housing 802, their use on the exterior side 910 of housing is generally sufficient to allow gasket 604 to be aligned with housing 802 and, in turn, cover glass 803. In some embodiments, the groove and extended alignment flaps may only be used on a portion of the perimeter of the gasket and not around the entire perimeter. In another embodiment, pins 935 could be formed on the gasket portion to fit into holes 930 machined into the housing 802 and/or cover glass 803 to align and secure gasket 604. The incursion of liquids or other contaminants from the exterior side 910 can be minimized or eliminated as with the other described embodiments.

Figure 10:
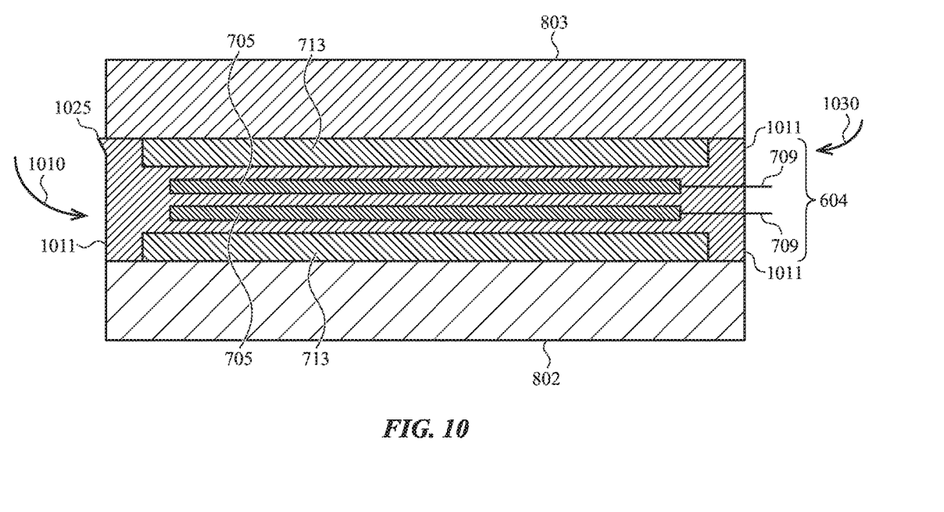
FIG. 10 shows a side sectional view of an alternate embodiment of a force sensing gasket taken through line 5-5 of FIG. 4.

FIG. 10 shows an alternate embodiment in which gasket 604 includes an angled flap portion 1025 in addition to flap portions 1011 of to provide additional sealing for cover glass 803. In this embodiment the elasticity of elastomeric material comprising gasket 604 is used to further seal cover glass 803 by biasing the angled portion 1025 against the cover glass 803 when the portable electronic device is assembled. Flexible force sensing circuits 705 are arranged in substantially parallel planes with electrical connection tails 709 protruding from gasket 604 into the interior side 1030 of the housing 802 for electrical connection to the electronic components contained therein.

Figure 11:
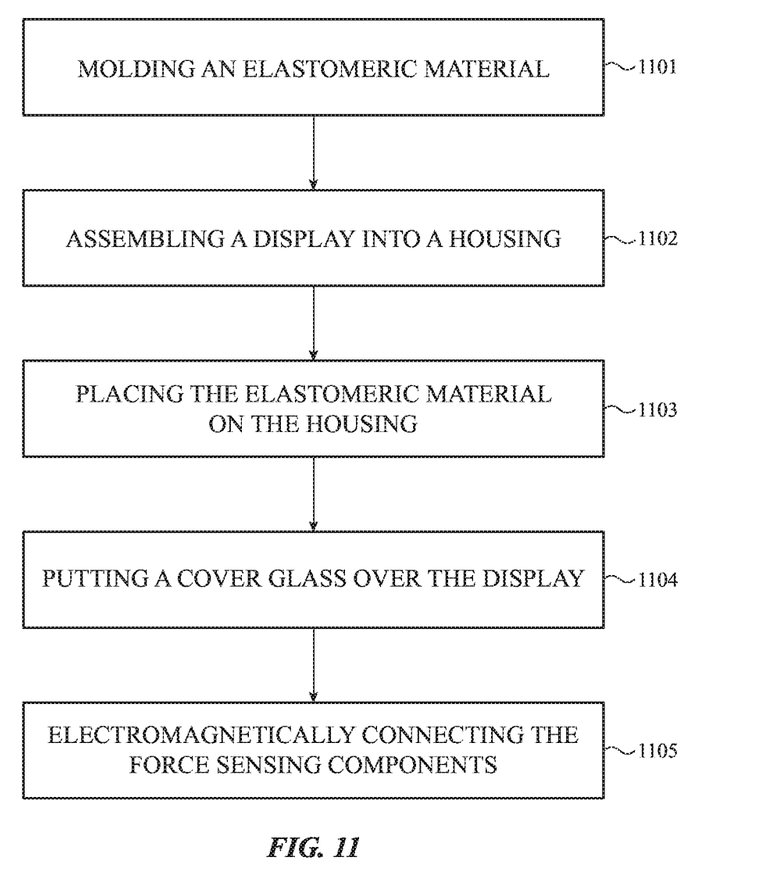
FIG. 11 is a flow chart of a method for making a portable electronic device.

FIG. 11 is a flow chart illustrating the operations for assembling a portable electronic device. In operation 1101, the operation of molding an elastomeric material to form a gasket may encapsulate force sensing components such as flexible circuits. The molding operation may include using compression molding or injection molding techniques to mold the gasket. The elastomeric material may be silicone or other material and the molding may be done in one or multiple operations. For example, in one embodiment, the molding operation may include clamping the flexible circuits and molding a first portion around a portion of the flexible circuits and then clamping the molded portion and molding around a second portion of the flexible circuits while maintaining the electrical connections to the flexible circuits outside the molded material. In another embodiment, the tails or electrical connections of the flexible circuits may be clamped and the elastomeric material encapsulating the remaining portion of the flexible circuits. Operation 1101 may also include molding channels and or flaps on the elastomeric material to facilitate placement and gluing of the elastomeric gasket and to reduce the quantity of interface layers which may be subject to attack by foreign substances.

Referring again to FIG. 11, the operation 1102 of assembling a display with a housing may include placing additional electronic components in the housing. In operation 1103, the molded elastomeric material is placed on the housing adjacent the perimeter of the housing. This operation may include applying liquid glue, including epoxy glue, to a channel in the molded gasket material to bond the gasket to the housing. In some embodiments, operation 1103 may include placing liquid adhesive in a channel to bond to the cover glass. Operation 1103 may also optionally include inserting alignment flaps in a groove in the housing to facilitate proper placement and alignment of the gasket with the cover glass and housing.

Operation 1104 in FIG. 11 includes putting a cover glass over the display thereby sandwiching the elastomeric material gasket between the cover glass and the housing. The cover glass is secured to the gasket either by a pressure sensitive adhesive layer applied to the gasket or by the liquid glue optionally applied to a gluing channel in the gasket as described above in operation 1103. In operation 1105, the electromagnetic connection is made between the force sensing components such as the encapsulated flexible circuits and the circuitry in the housing. The force sensing circuits are encapsulated in substantially parallel planes in operation 1101 and the force exerted by a user on the cover glass may be measured by the change in capacitance measured between the flexible circuits due to the change in distance between them which, in turn, changes the capacitance between the flexible circuits.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A force sensing gasket for a portable electronic device comprising:
   at least two force sensing flexible circuit portions arranged in substantially parallel planes;
   an elastomeric material encapsulating the force sensing flexible circuit portions; and
   at least one electromagnetic connection attached to each one of the force sensing flexible circuit portions, each connection extending outside the elastomeric material.

2. The force sensing gasket of claim 1 wherein the elastomeric material includes a channel on at least a portion of the elastomeric material.

3. The force sensing gasket of claim 2 wherein the channel includes an irregular surface in a plane substantially parallel to the planes of the force sensing flexible circuit portions.

4. The force sensing gasket of claim 3 wherein the elastomeric material is silicone.

5. The force sensing gasket of claim 1 wherein the elastomeric material includes a portion extending in a direction perpendicular to the planes.

6. A portable electronic device comprising;
a housing including a perimeter adjacent an exterior;
a display contained by the housing;
a cover glass extending over the display and cooperative with the perimeter of the housing;
a gasket adjacent the perimeter and contained between the housing and the cover glass, the gasket comprising:
an elastomeric material;
force sensing circuitry encapsulated within the elastomeric material; and
an electromagnetic connection extending from the force sensing circuitry and outside the gasket.

7. The portable electronic device of claim 6 wherein the gasket includes an extended alignment flap extending toward the housing.

8. The portable electronic device of claim 7 wherein the housing includes a groove for receiving the extended alignment flap.

9. The portable electronic device of claim 7 wherein the extended alignment flap includes a pin.

10. The portable electronic device of claim 6 wherein the gasket includes a channel on at least a portion of a surface adjacent the housing.

11. The portable electronic device of claim 6 wherein the force sensing circuitry includes two flexible force sensing circuits including electrical connectors extending outside the elastomeric material.

12. The portable electronic device of claim 6 wherein the gasket includes a first extended alignment flap extending from the perimeter adjacent the cover glass.

13. The portable electronic device of claim 12 wherein the first extended alignment flap extends approximately perpendicular to the cover glass.

14. The portable electronic device of claim 12 wherein the first extended alignment flap extends at an angle to the cover glass.

15. The portable electronic device of claim 12 wherein the gasket includes a second extended alignment flap extending from a surface adjacent the housing.

16. A method for making a portable electronic device comprising the operations of:
molding an elastomeric material to encapsulate force sensing components;
assembling a display into a housing;
placing the elastomeric material adjacent a perimeter of the housing;
putting a cover glass over the display thereby sandwiching the elastomeric material between the cover glass and the housing; and
electromagnetically connecting the force sensing components to circuitry in the housing.

17. The method of claim 16 wherein the operation of molding includes injection molding.

18. The method of claim 16 wherein the operation of molding includes compression molding.

19. The method of claim 16 wherein the operation of placing includes applying adhesive to a channel in the elastomeric material.

20. The method of claim 16 wherein the operation of placing the elastomeric material includes inserting an aligning feature on the elastomeric material into a groove in the housing.

* * * * *